United States Patent
Cardina et al.

(10) Patent No.: US 9,117,210 B2
(45) Date of Patent: Aug. 25, 2015

(54) SYSTEMS AND METHODS FOR RANDOMIZED MOBILE PAYMENT

(76) Inventors: Donald Michael Cardina, Lawrenceville, GA (US); Lee P. Huggins, Rincon, GA (US)

(*) Notice: Subject to any disclaimer, the term of this patent is extended or adjusted under 35 U.S.C. 154(b) by 93 days.

(21) Appl. No.: 13/063,676

(22) PCT Filed: Apr. 30, 2009

(86) PCT No.: PCT/US2009/042212
§ 371 (c)(1),
(2), (4) Date: Mar. 11, 2011

(87) PCT Pub. No.: WO2010/126509
PCT Pub. Date: Nov. 4, 2010

(65) Prior Publication Data
US 2012/0116902 A1    May 10, 2012

(51) Int. Cl.
| | |
|---|---|
| G06Q 20/00 | (2012.01) |
| G06Q 20/38 | (2012.01) |
| G06Q 20/10 | (2012.01) |
| G06Q 20/20 | (2012.01) |
| G06Q 20/32 | (2012.01) |
| G06Q 20/40 | (2012.01) |

(52) U.S. Cl.
CPC .............. *G06Q 20/385* (2013.01); *G06Q 20/10* (2013.01); *G06Q 20/204* (2013.01); *G06Q 20/32* (2013.01); *G06Q 20/40* (2013.01)

(58) Field of Classification Search
None
See application file for complete search history.

(56) References Cited

U.S. PATENT DOCUMENTS

2006/0124756 A1    6/2006  Brown
2009/0037333 A1*   2/2009  Flitcroft et al. ............... 705/44

FOREIGN PATENT DOCUMENTS

| GB | 2446179 A * | 8/2008 |
| WO | WO 2006/125266 A2 | 11/2006 |
| WO | WO 2008/002260 A1 | 1/2008 |
| WO | WO 2010/126509 A2 | 11/2010 |

OTHER PUBLICATIONS

NPL_CVV2_Card security code, Wikipedia definition of Card Security Code, 1997-2001, 4 pages, downloaded on Mar. 15, 2014 from http://en.wikipedia.org.*
International Patent Application No. PCT/US2009/042212: International Search Report and Written Opinion dated Oct. 21, 2011, 11 pages.

* cited by examiner

*Primary Examiner* — Paul Danneman
(74) *Attorney, Agent, or Firm* — Baker & Hostetler LLP

(57) ABSTRACT

Systems and methods for improving security in mobile payment systems are described. A user device may be operated to request temporary account data for an account. No actual account number may be stored on the device. A remote system may correlate temporary account data to actual account data and transmit temporary account data to the user device, which use the data to make a purchase or generate a temporary account number than may be used to make a purchase. Temporary account data may be automatically erased or expire. A purchase authorization request may be sent by a merchant with temporary account data to a provider of temporary account data. The provider may transmit a request for purchase authorization using actual account data to a payment processor, sending a response to the merchant that does not include actual account data based on a response from the payment processor.

26 Claims, 7 Drawing Sheets

SYSTEMS AND METHODS FOR RANDOMIZED MOBILE PAYMENT

CROSS REFERENCE TO RELATED APPLICATIONS

This application claims priority to International Application No. PCT/US2009/042212, filed Apr. 30, 2009, which is herein incorporated by reference in its entirety.

TECHNICAL FIELD

The disclosed systems and methods generally relate to financial transaction systems. More specifically, the disclosed systems and methods relate to providing payment using randomized temporary account numbers and systems and methods for obtaining and using randomized temporary account numbers on a mobile device.

BACKGROUND

Traditionally, purchases made with a credit or debit card have been completed by swiping the credit or debit card through a merchant's point of sale (POS) device. POS devices currently in use typically have a magnetic reader that reads the account information from the card when the card is swiped through the reader, such as a personal account number and an expiration date. This account information is then transmitted over a wired or wireless network to a payment service provider for processing. Purchases are also made without using a POS terminal directly. For example, a customer may telephone a merchant and provide credit or debit card information verbally. Purchases may also be completed over the internet, a practice that is becoming more common, by providing credit or debit card information to a web server through a web site. Because account information is contained on the credit or debit card itself, unauthorized use is difficult to prevent if the card owner does not have physical control over the card and has not notified the card issuer that the card has been lost or stolen.

More recently, the information typically gathered from the magnetic strip on a credit or debit card has been made available on electronic devices that can be detected by POS devices without physical contact. In such systems, a POS device may use near field communications (NFC) to detect information on a customer's electronic device. Customer devices that may be used to contain and transmit account information include mobile telephones, personal data assistants (PDAs), and passive devices such as radio-frequency identification (RFID) tags. In these implementations, the customer's actual account numbers are contained on the electronic device, so, like an actual credit or debit card, unauthorized use is not easily preventable if the device is not in the customer's physical control.

In an effort to reduce fraud and protect consumers, additional information may be required beyond that provided by a credit or debit card or electronic representation thereof, especially in situations where the purchaser is not physically present at a merchant location, such as when a purchase is completed over the phone or through a web site. Such additional information may include a particular code printed on the card itself (known variously as a card verification value (CVV), card validation code (CVC), or card ID (CID)) or a billing address zip code. Other efforts to reduce fraud include checking the signature on the back of a credit or debit card for a match against a signed sales receipt, using a personal identification code, and requiring a driver's license matching the name on the credit or debit card. Despite these efforts, which complicate the purchasing process and therefore may not be desirable by consumers or merchants, fraudulent use of credit and debit cards is still prevalent and of concern to consumers and merchants everywhere.

SUMMARY

Systems and methods are disclosed for requesting, generating, and using temporary account numbers. A user may operate a user device to request a temporary account number associated with an account identified on the user device. The user device may not have any actual account information, such as an account number, for the identified account. A temporary account number provider may receive the request, determine an actual account associated with the account identified in the request, the user, or the device originating the request, and transmit a response to the user device. The response may include a temporary account number, expiration date, and any other account information that may be required or useful in making a purchase. Alternatively, the user device itself may generate a temporary account number. The temporary account number information may be viewed for purchases via web where card presence in not required or the user device may then transmit the temporary account data to a merchant, in one embodiment using near-field communications (NFC), in order to complete a purchase.

A purchase request including a temporary account number may be transmitted from a merchant to a temporary account number provider, either directly or indirectly. The temporary account number provider may correlate the temporary account number in the request with an actual account number and transmit a purchase request to a payment processor including the actual account number. Upon receiving a response from the payment processor, the temporary account number provider may transmit a response to the merchant including the temporary account number. Thus, the merchant and the user device never need to obtain or store the actual account number, thereby limiting the possibility of fraud.

Additional security measures may be implemented to further limit the possibility of fraud. A user may be required to submit a PIN at a user device in order to request a temporary account number and related data. Temporary account numbers received on a user device may expire and be automatically deleted after a period of time, or may be manually deleted when the user is finished with them. Other advantages and embodiments of the present disclosure will be described herein.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION OF ILLUSTRATIVE EMBODIMENTS

Figure 1:
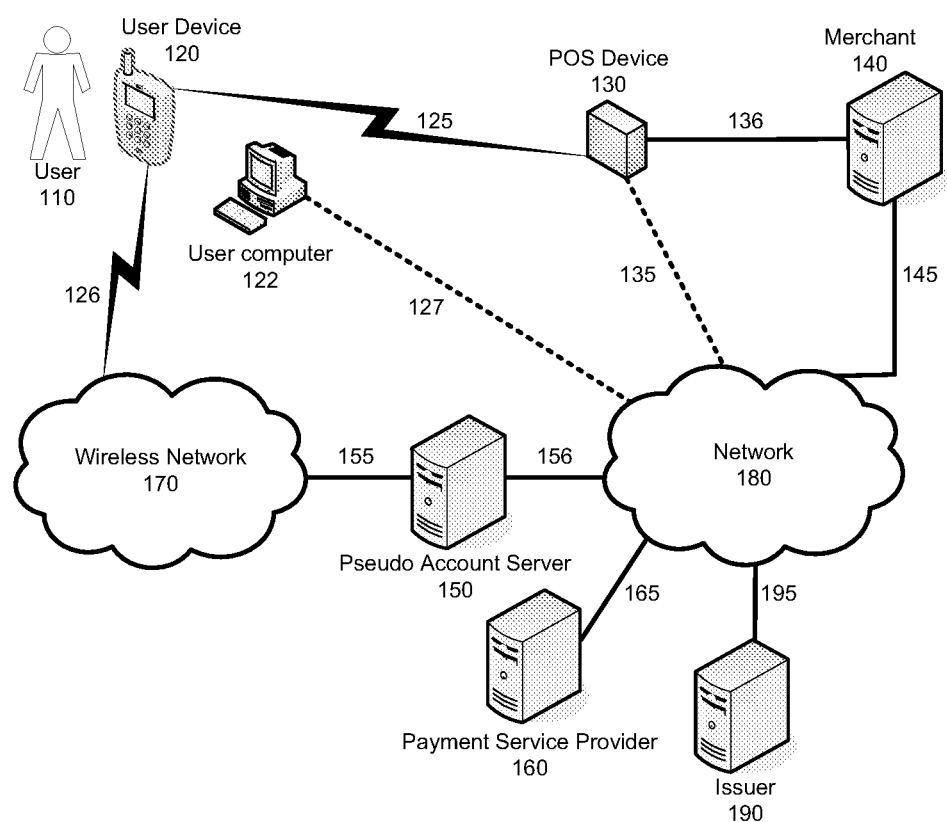
FIG. 1 is a graphical representation of a non-limiting exemplary system in which systems and methods for randomized mobile payments may be implemented.

FIG. 1 illustrates a non-limiting exemplary system for randomized mobile payment. User 110 may be operating user device 120 at a merchant location. In an alternative embodiment, user 110 may be operating user device 120 while shopping online and operating, for example, user computer 122. Alternatively, user computer 122 and user device 120 may be the same device. User device 120 may be a device of any type that is configured to transmit and/or receive of communication signals. For example, user device 120 may be a cellular telephone, a wireless computer, a wireless personal digital assistant (PDA), a wireless video phones, an electronic wallet, or any other portable electronic device configured to implement at least one aspect of the methods and systems recited herein. In some embodiments, user device 120 is also configured with near field communication (NFC) components and/or software that allows user device 120 to exchange data with other devices using short-range wireless communication technology. All other forms of wireless technologies are contemplated.

User 110 may wish to make a purchase or otherwise provide payment to a merchant or other entity using an account. The account may be a credit or charge account and have associated with it a credit card (MASTERCARD®, VISA®, AMERICAN EXPRESS®, merchant-specific credit card, or any other type of credit or charge card.) Alternatively, the account may be a bank account, such as a checking account or a savings account, and have a debit card or automated teller machine (ATM) card associated with it. In another alternative, the account may be a stored value account and have an associated stored value card. In yet another alternative, the account may be a customer or club member type account, such as a frequent flyer account, and may have a customer or member card associated with it. In still other embodiments, a device or object other than a card may be used for purchases, such as a programmable key fob or other detectable device. In other embodiments, an account may not be financial but instead provide access or other identification information, and may have a card or object associated with it, for example, and access card to allow access into restricted areas, or an identification card that identifies the holder or owner of the account or card. All such embodiments are contemplated as within the scope of the present disclosure.

User device 120 may be configured to communicate with wireless network 170. Wireless network 170 may be one or more appropriate telephony radio network, or any other type of communications network, or any combination thereof. Technologies used in wireless network 170 may include global system for mobile communications (GSM), code division multiple access (CDMA), and/or any other form of effective data transport utilizing any communications protocols. Wireless network 170 may support unstructured supplementary service data (US SD), short messaging service (SMS) and/or multimedia messaging service (MMS), and such service may be implemented independently of the method of data transport, and do not depend on any particular network architecture, or underlying protocols. Any protocols or other network technologies may be used on wireless network 170, including WiFi, WiMax, internet protocol (IP), wireless application protocol (WAP), and any other technology or protocol. Any configuration and implementation of communications networks, wired, wireless, and any combination thereof, are represented by wireless network 170, and all such embodiments are contemplated as within the scope of the present disclosure.

When user 110 wishes to obtain a temporary account number, user 110 may operate user device 120 so that a request for a temporary account number or temporary account data is generated and transmitted to a pseudo account server. User device 120 may be configured with software that is provided or maintained by a temporary account number service provider that enables user device 120 to send requests for and/or process responses to requests for temporary account data. In one alternative, user device 120 may be configured with software enabling it to generate temporary account data. A request for temporary account data may be transmitted over wireless communications link 126 to wireless network 170 using any effective means. In one embodiment, the request is transmitted as an SMS message. In another embodiment, the request is transmitted as an encrypted SMS message. In still another embodiment, the request may be sent as an abbreviated dial code or a control signal. Upon receipt of the request, wireless network 170 may transmit the message to pseudo account server 150, which may communicate with wireless network 170 using any effective means over communication link 155, which may be a wired or wireless link. Pseudo account server 150 may process the request and reply with a temporary account number and, in one embodiment, other relevant details such as an expiration date. Alternatively, pseudo account server 150 may process the request and reply with other temporary account data, such as a key or seed that allows user device 120 configured with appropriate software to generate a temporary account number and/or related information.

In one embodiment, the temporary account number provided or generated is in the same format as the actual account number associated with it. For example, if the actual account number or card number is a 16 digit number, the temporary account number may also be a 16 digit number. Any other combination and number of numbers, letters, or other characters, or any other identifier of an account may be used. Likewise, additional temporary data provided, such as an expiration date, may also be in the format that is used by the actual data. This may enable a user to use the temporary account data in an identical manner as the user would use actual account data. Processing of the request may include evaluating the request and determining actual account number information associated with user 110, and then selecting an appropriate temporary account number and related information, or an appropriate key or seed value. In another embodiment, user device 120 may generate a temporary account number, with or without communicating with a pseudo account server. Details on methods of requesting and processing requests for temporary account numbers and data will be discussed in more detail herein.

Upon receiving the reply from pseudo account server 150 containing a temporary account number or other temporary account data, or upon generation of a temporary account number by user device 120, user 110 may proceed with a purchase. In one embodiment, user 110 may operate user device 120 to transmit the received temporary account number using NFC communications link 125 to point of sale (POS) device 130, which may be located at a merchant premises. Alternatively, user device 120 may be configured to automatically transmit the temporary account number using NFC communications link 125 to POS device 130 upon receipt of the temporary account number. In another embodiment, user 110 may read the temporary account number and related information from user device 120 and enter the information into a web page using user computer 122. Alternatively, user computer 122 may be configured to detect NFC signals and detect the temporary account number and related data from user device 120. In still another embodiment, user device 120 and user computer 122 may be integrated into a single device, and the temporary account number may be exchanged internally between hardware and/or software components of the integrated user device 120 and user computer 122. In yet another embodiment, user 110 may read the temporary account number from a display of user device 120 and provide the account number orally or via other means to the merchant. All such embodiments are contemplated as within the scope of the present disclosure.

POS device 130, having received the temporary account number and any related information from user device 120 via NFC in one embodiment, may then transmit a request for authorization of the purchase to the payment service provider. In one embodiment, POS device 130 transmits the request to merchant device 140 over communications link 136. In another embodiment, POS device 130 transmits the temporary account number and any related information over communications link 136 to merchant device 140, which then generates a requests based on the information provided by POS device 130. In yet another embodiment, merchant device 140 may receive the temporary account number and any related information through network 180 from user computer 122 and generate a request for purchase authorization. The request may then be transmitted to network 180 over communications link 145. In yet another embodiment, POS device 130 may be configured with its own communication capabilities, and may transmit a request for purchase authorization directly to network 180 using communications link 135, which may be a wired or wireless communications link. Any means of generating a request and transmitting such a request on a network are contemplated as within the scope of the present disclosure.

Network 180 may be any type of data network capable of enabling communications between two or more devices, including the Internet. Network 180 represents any number of interconnected data networks, utilizing any type of communications technologies and protocols, or any combination of technologies and protocols, included wired and wireless communications means. Once the purchase authorization request is received on network 180 from either POS device 130 or merchant device 140, it may be transmitted to payment service provider device 160 over communications link 165 using any communications means, including wired and wireless.

Payment service provider device 160, or one or more other devices communicatively connected to payment service provider device 160, may process the request for purchase authorization. Such processing may include evaluating the temporary account number contained in the purchase request and determining that pseudo account server 150 is the appropriate server to authorize the purchase. Payment service provider device 160 may then transmit the request for purchase authorization to pseudo account server 150 over network 180.

Upon receipt of the request for purchase authorization, pseudo account server 150 may process the request to determine if the purchase is authorized. Such processing may include determining the temporary account number from the purchase authorization request, determining an actual account number associated with the temporary account number, and determining an issuer or financial institution associated with the financial institution. Pseudo account server 150 may generate another request for purchase authorization using the actual account number associated with the a temporary account number and transmit the request to issuer device 190 over network 180 for authorization.

Issuer device 190 may receive the request over communications link 195 and perform authorization processing on the request, including checking for sufficient credit, a valid account in good standing, and any other relevant data, and determine an appropriate response. The response may then be transmitted to pseudo account server 150, which may then transmit the response to payment service provider device 160, in one embodiment altering the response or performing other processing on the response. In another embodiment, upon receiving the response from issuer device 190, pseudo account server 150 generates a separate response based on the received response from issuer device 190. Pseudo account server 150 may transmit a response to the device that initially requested purchase authorization, such as merchant device 140 and/or POS device 130. The merchant and user 110, in one embodiment automatically through the use of merchant device 140 and/or POS device 130, may then complete the purchase. In many embodiments, the merchant never has or needs access to any actual account data, and similarly, actual account data is never present on user device 120, thus ensuring that actual account data is never exposed for misuse during the purchase process.

The activities described in regard to FIG. 1 will now be disclosed in more detail in the following methods. The disclosed methods may be implemented separately by parts of a randomized mobile system, or may be implemented in a single device or subsystem. The following methods may be implemented using any number and types of devices, in conjunction with any number and types of networks. All such implementations are contemplated as within the scope of the present disclosure.

Figure 2:
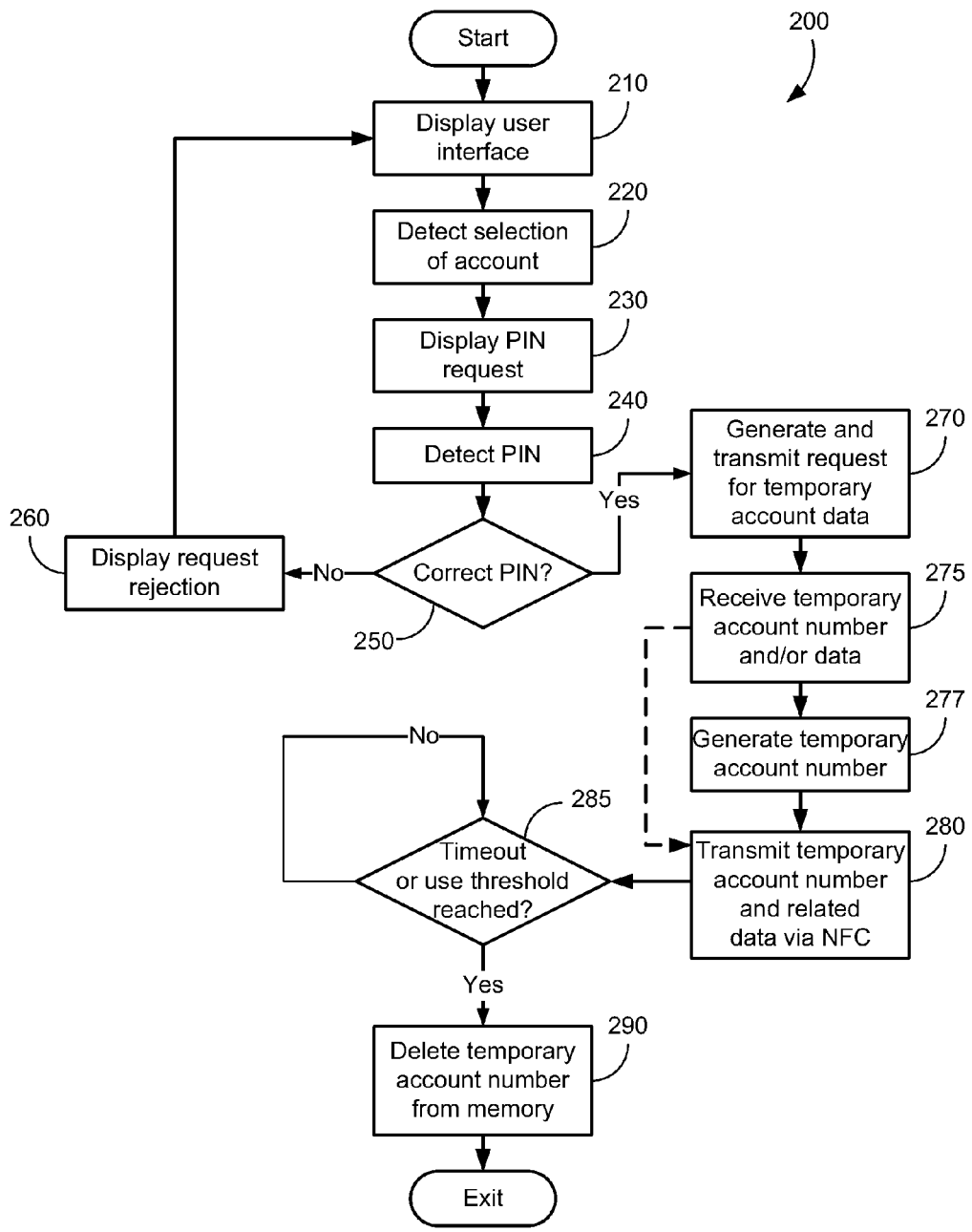
FIG. 2 is a graphical representation of a non-limiting exemplary method of implementing an aspect of a randomized mobile payment system.

FIG. 2 illustrates a non-limiting exemplary method 200 of requesting and receiving a temporary account number. The aspects of the disclosure described in relation to FIG. 2 may be performed by a user device, such as user device 120, or any other device capable of performing these aspects. Such devices include mobile communications device, such as mobile telephones, equipped with hardware and software configured to perform the disclosed aspects. It is contemplated that all such embodiments are within the scope of the present disclosure.

At block 210 a user interface is displayed. This may be generated by software on a user device stored in memory and executed by one or more user device processors. This software may be downloaded or otherwise installed on a user device and may be provided by and/or maintained by a temporary account data service provider. This software may be downloaded in its entirety each time a user operates a user device to obtain temporary account data, or parts of the software, such as specific components, keys, seeds, sets of temporary account number, libraries, modules, or any other software element may be downloaded or otherwise obtained each time a user operates a user device to obtain temporary account data. Alternatively, this software may be downloaded or otherwise obtained once and reused each time a user operates a user device to obtain temporary account data, with or without periodic updates.

The user interface may be displayed on one or more displays configured on the user device or communicatively connected to the user device. The user interface combined with the user device may allow for the selection of visual items presented, the entering of textual information, and/or the detection of activation of controls, such as buttons. The user interface presented on a display may include a listing of account types, which, when selected, may generate a display of specific accounts associated with the selected account types. Alternatively, the user interface may present a listing of specific accounts. Specific accounts may be identified by user defined labels or other identifiers. However, in the preferred embodiment, the actual account numbers associated with the specific accounts are not displayed or stored on the user device in any form. The list of accounts may be stored on the user device, or the list may be downloaded from a temporary account number provider device at each execution of software used for temporary account number requests. Exemplary user interfaces are described in more detail herein.

At block 220, the selection of an account is detected. This may be accomplished through any effective means, such as detecting the actuation of an input button or activation of any input control, determining the area of a display that is highlighted, or otherwise detecting which of the displayed accounts are selected. At block 230, a request for a personal identification number (PIN) is displayed. This may be a simple numeric code, or may be alphanumeric, and may be of any length. Alternatively, other security measures may be employed, such as biometric confirmation (finger print, retina scan, etc.), one or more required security questions and answers, or any other type of confirmation known in the art, now known or to be developed. Any security information requested and/or required may be user configurable, and may or may not be associated with other PINS, such as those used for access to an account at a financial institution automated teller machine (ATM). Any means or mechanism for preventing the request of a temporary account number and related information by unauthorized persons is contemplated. Note that the PIN and/or other security measures blocks of the present method may be implemented before or after displaying account numbers and detecting a user selection of an account. For example, a correct PIN detection may be required before user accounts are displayed in a user interface, and/or before a user is permitted to select a user account. All such embodiments are contemplated as within the scope of the present disclosure.

At block 240 the PIN or other security related input may be detected using any effective means. At block 250, a determination may be made as to whether the PIN or other security input is correct or otherwise satisfies predetermined security requirements. If not, at block 260 a rejection message may be displayed and the user interface may again be presented at block 210. Alternatively, rather than returning the user to the user interface, the user may be locked out of the software application implementing method 200, or locked out of the device running the software implementing method 200. In an alternative embodiment, a user may be allowed a predetermined number of times in which an incorrect PIN or other security information may be provided before the user is locked out of the software and/or the device. In other embodiments, there may be no limit on the amount of incorrect security inputs allowed. The number of incorrect security inputs allowed may be user configurable in some embodiments. Any configuration of security measures may be implemented and all such configurations are contemplated.

If the PIN or other security input provided by the user is correct or satisfactory, then at block 270, a request for a temporary account number and related information is generated and transmitted to a provider of such numbers, such as pseudo account server 150 of FIG. 1. Alternatively, a request for temporary account data allowing generation of a temporary account number and related information, such as a seed or key, is generated and transmitted to a provider of such data. Note that a request for temporary account data allowing generation of a temporary account number and related information may be sent when a purchase is desired, or may be sent at any time, and used to generate a temporary account number when a purchase is desired.

The request transmitted to a provider may consist of any information that may be used by a provider of temporary account numbers to identify a particular account, some of which may be provided by default depending on the communication technology. For example, the telephone number associated with the user device may identify the user in a database maintained by a provider of temporary account numbers. Alternatively, a unique number, value or other identifier may be associated with the user and/or user device in a database maintained by a provider of temporary account numbers. This number or other identifier may accompany a request for a temporary account number, in some embodiments by default if the protocol used to transmit the message, such as SMS, includes such numbers by default. In other embodiments, the request may also include a code, a unique number, a value, a nickname or other identifier associated with an account, or other identifying data that specifies a particular account from among a plurality of accounts. The request may also include a dollar amount of the purchase or an amount to be preauthorized. The request may be sent using any means, including as an USSD, SMS or MMS message, as an abbreviated dial code or a control signal, using WiFi, WiMax, or other wireless technologies, and may be encrypted using any encryption means. Any information that may be used to specify a particular account and/or an amount to be charged against the account, as well as any effective communication means of transmitting a request, is contemplated.

At block 275, a temporary account number, temporary account data, and/or any related data may be received on a user device. The temporary account number and/or any related data may be received as an USSD, SMS, or MMS message, or via any other communications means. Related information may include a credit or debit card name, expiration date, PIN, CVV, CVC, CID, billing zip code, lifespan or timeout value, number of uses, credit limit, credit or debit limit per transaction, or any other relevant information. In one embodiment, a provider of temporary account numbers may always use the same expiration date, or the same part of an expiration date, such as the year, for each temporary account number and related data generated for a particular account. This may assist a user in tracking which temporary account data corresponds to which account, and verifying that any temporary account data received is associated with the correct account or card. For example, temporary account data with an expiration date in the year 2011 may always be provided for a user's AMERICAN EXPRESS® card. Any other means or methods of encoding identifiers of an account into temporary account data that does not include actual account numbers or other actual account data are contemplated as within the scope of the present disclosure. If a temporary account number and related data is received at block 275, the method progresses to block 280.

In another embodiment, rather than a complete temporary account number, a seed or key may be received on the user device at block 275 that allows software and/or hardware configured on the user device to generate a temporary account number at block 277. In some embodiments, the seed or key may be accompanied by a partial temporary account number and/or related temporary account information. The entire temporary account number may be generated by the user device from the seed by applying an algorithm to the key or seed to generate the account number. Alternatively, a portion of the temporary account number may be generated by applying an algorithm to the key or seed and appended the generated number to a portion of the temporary account number received in the response, stored on the user device, or obtained by other means. For example, the first eight digits of a 16 digit account number may be predetermined and received on the user device in a response from a temporary account number provider, or already stored on the user device. The user device may then receive a seed or key value which is then manipulated by software and/or hardware on the user device to generate the last eight digits of the 16 digit account number. The temporary account number may then be formed by appending the generated eight digits to the predetermined eight digits. Other means and methods of generating whole or partial account numbers from seeds, keys, or other data are contemplated as within the scope of the present disclosure.

The number generation application operating on a user device may be unique to that particular user device by virtue of its software elements such that the number generation application operating in conjunction with a remote server that contains user account data, such as pseudo account server 150 of FIG. 1, will create temporary account numbers that are unique to that particular server/user device pair. For example, a particular user device may have one or more keys that correspond to one or more keys maintained by a remote server. The combination of those keys may allow the user device to generate temporary account numbers that other user devices with different sets of keys or different configurations of software cannot generate. Any combination of keys and devices that may be used to create unique data for use as temporary account numbers and related information are contemplated as within the scope of the present disclosure.

At block 280, the relevant information required for a purchase is transmitted via a user device's NFC components. This allows the user to move the device into an area proximate to a merchant's POS device equipped with NFC components and transmit the temporary account number and other information to the merchant to complete the purchase. In another embodiment, the temporary account number and related information may be displayed to the user instead of, or in addition to, transmitting such information via NFC. This allows the user to see the information and provide it orally or input it in an alternative manner. For example, if the temporary account number and related information is associated with a debit card, the user may be required to enter a PIN into a merchant's POS device. The temporary PIN to be used with the temporary account number may be presented to the user on the user device. Confirmation of rejection of the purchase may also be received by the user device from the merchant POS device using NFC or any other means of communication.

Alternatively the user may be making a purchase online, and may enter the temporary account number and related information read from the display of a user device into a web page to complete a purchase. In another embodiment, the user device may communicate with a user computer via NFC or any other means and transmit the temporary account number and related information to the user computer to complete a purchase. In yet another embodiment, the user may be operating the user device to access the Internet and the temporary account number and related information may be conveyed internally within the user device to another software application that is communicating with a web server to conduct an online transaction. All such embodiments are contemplated as within the scope of the present disclosure.

At block 285, a determination is made as to whether a timeout threshold has been reached for the temporary account number. Each temporary account number and related information may be associated with a predetermined lifespan on the user device. By limiting the lifespan of a temporary account number and related information, use of such numbers and information by unauthorized users may be prevented even if such users acquire the device and successfully provide security information. This lifespan may be user configurable, configured by the issuer or pseudo account provider, or may be preconfigured in the software implementing method 200. The lifespan of a temporary account number and related information may be received within the response received at block 275, and may be any amount of time. In one embodiment, the lifespan of a temporary account number and related information may be set a small number of minutes, such as five or ten minutes. A user device may look at the timestamp of the response received that provided the temporary account number and compare that timestamp to the current time maintained by the device in order to determine whether the lifespan has expired. Any other means used to determine whether the lifespan has expired may be used and all such implementations are contemplated as embodiments of the present disclosure.

In an alternative embodiment, a number of uses may be determined at block 285. Each temporary account number and related data may be valid for only a limited number of uses. For example, each temporary account number and related data may be usable only one time. In some embodiments, this may be user configurable, while in other embodiments the number of uses permitted may be system determined. In one embodiment, once the threshold of uses is reached, the temporary account number and related data is automatically erased from a user device. Other configurations based on a number of uses are contemplated.

If the lifespan of the temporary account number and related information has not expired, the method returns to block 285 to check again. Once the lifespan has expired, at block 290 the user device and/or software configured thereon may delete the temporary account number and all related information from memory, data storage, and any where else that the information may have been recorded on the user device, and the method is complete. This ensures that the temporary account number will not be available to any users, authorized or not, in the future, thus reducing the opportunity for fraud using the temporary account number. Any means and methods may be used to remove the data from the user device, and all such embodiments are contemplated as within the scope of the present disclosure.

Figure 3:
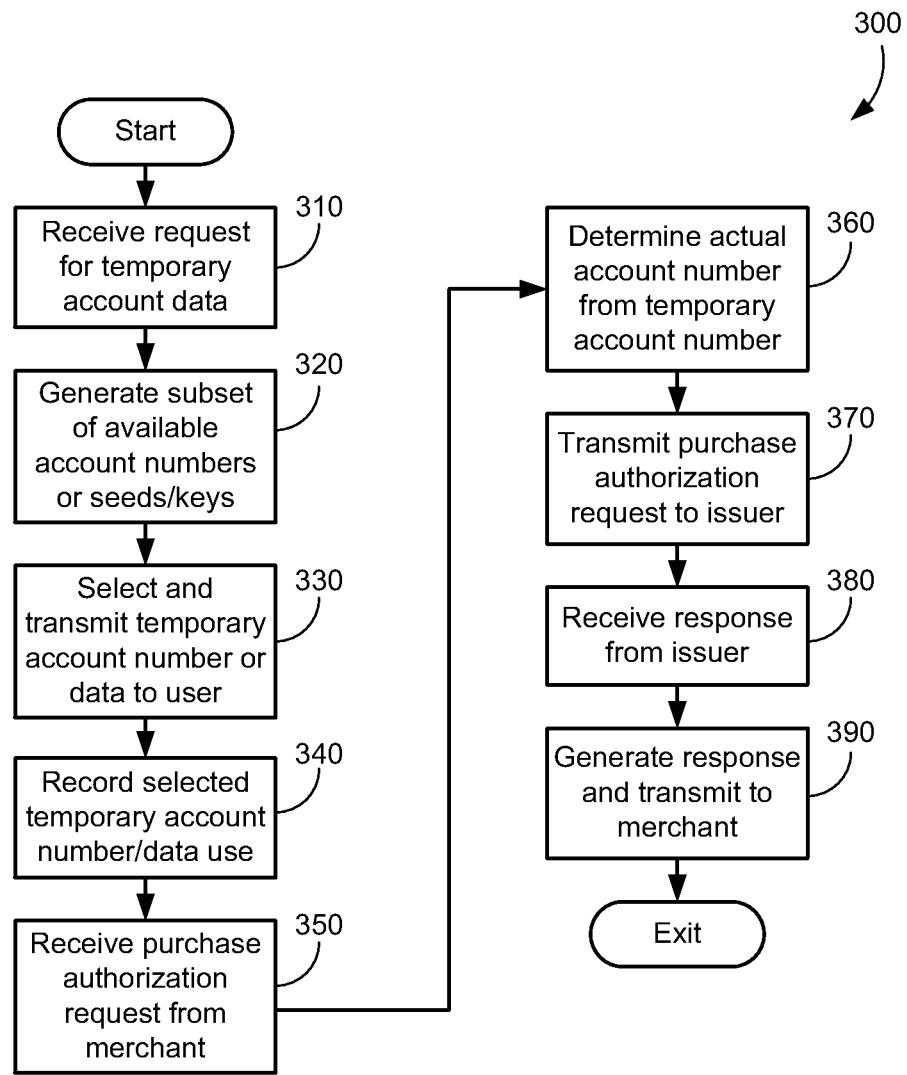
FIG. 3 is a graphical representation of a non-limiting exemplary method of implementing another aspect of a randomized mobile payment system.

FIG. 3 illustrates a non-limiting exemplary method 300 of receiving a request for a temporary account number, providing a temporary account number, and handling a request for purchase authorization using a temporary account number. The aspects of the disclosure described in relation to FIG. 3 may be performed by one or more computing device, such as pseudo account server 150, payment service provider device 160, issuer device 190, and/or any other device or combination of devices capable of performing these aspects. Such devices may be equipped with hardware and software configured to perform the disclosed aspects. It is contemplated that all such embodiments are within the scope of the present disclosure.

At block 310, a request for a temporary account number and related information, or a request for temporary account data that may be used to generate a temporary account number and related information, may be received at a provider of temporary account numbers. The request maybe received as an USSD, SMS or MMS message, or via any other communications means. The request may contain any information that may be useful in performing other aspects of method 300, including a user device telephone number, one or more codes indicating a particular account, a nickname associated with an account, or other identifying data that specifies a particular account from among more than one accounts. The request may also include a dollar amount of the purchase or an amount to be preauthorized. All such embodiments are contemplated as within the scope of the present disclosure.

At block 320, a subset of available temporary account numbers may be generated. This subset may be generated from a list of account numbers provided by an issuer. For example, the issuer of card type X may provide a block of card numbers (for example 1234-5678-1000-0000 through 1234-5678-1099-9999) to a provider of temporary account numbers. Then, when a user requests a temporary account number to use for an account of card type X, one of the pool of numbers provided the issuer of card type X may be used as a temporary account number for that user. The pool of numbers available for use as temporary account numbers may or may not be reused. Other criteria may also be used to further select the subset of available account numbers. In one embodiment, each time a temporary account number is used, a record of the use is stored that may include identifying information on the user or device that has used the temporary account number, such as a telephone number or user ID. In some embodiments, a particular temporary account number may not be used by the same user and/or user device more than once. In other embodiments, once a particular temporary account number is used, it may not be used again by any user for a predetermined amount of time, such as three or six months. Following the predetermined amount of time, in some embodiments, the particular temporary account number may be used by users other than those users who have used it in the past. Any other criteria may be used to generate a subset of available account numbers for use as temporary account numbers, and all such embodiments are contemplated as within the scope of the present disclosure.

Alternatively, a subset of keys or seeds may be generated at block 320 from which a key or seed may be selected that may be transmitted to a user device for the user device to use in the generation of a complete or partial temporary account number. The subset may be determined based on the past use of the keys or seeds, or the past use of temporary account numbers that are generated by the used of such seeds or keys. If the key or seed selected is intended for use in generating a partial temporary account number, a subset of partial temporary account numbers may be generated, from which a partial account number may be selected and sent to a user device for use with account number generation software and/or hardware configured to generate a partial account number. In this embodiment, the partial account number provided and the partial account number generated may be appended or otherwise combined to generate a complete temporary account number.

At block 330, a temporary account number and related information, and/or temporary account data such as a seed or key, is selected and transmitted to a user. Any means of selecting a temporary account number or data may be used, including randomly selecting a temporary account number from among the available account numbers or randomly selecting a key or seed from available keys or seeds. Other data may be determined at block 330 as well, such as an expiration date, CVV, CVC, CID, billing zip code, PIN, and any other information associated with the temporary account number that may be desirable. In some embodiments, preauthorization for the purchase may be performed at block 330 as well. For example, if the request for a temporary account number or data included an amount of purchase, the provider of temporary account numbers may determine the actual account number associated with the account identified by the request and transmit an authorization request to the issuer. The provider of temporary account numbers may then respond accordingly to the request for a temporary account number, in one embodiment denying the request if the purchase authorization failed. The temporary account information may be transmitted to the user in any effective manner, including as an USSD, SMS or MMS message. The information may be transmitted in the same manner as the request for a temporary account number was received, or in a different manner. Any manner of selecting an account number and related information and transmitting the same to a user are contemplated as within the scope of the present disclosure.

At block 340, the use of the selected temporary account number and related data, the use of a particular key or seed, or any other data that may be of use may be recorded. Note that this aspect may be performed before or after the temporary account number and related information is transmitted to a user at block 330. It is contemplated that such information may be stored in a database. Examples of information that may be stored include any or all of the information sent to the user (expiration date, CVV, CVC, CID, billing zip code, PIN, lifespan, etc.), a user name or other user identifying information, an account nickname, identifying information for the device that requested the temporary account number, identifying information for a seed or key used or the actual seed or key, actual account information for the actual account associated with the temporary account (issuer, account number, expiration date, and any other data), amount of purchase, and any other relevant data. This information may be accessed later to determine whether the temporary account number sent to a user is available for another request for a temporary account number. Any type of information and any means of storing such information are contemplated as within the scope of the present disclosure.

At block 350, a temporary account number provider may receive a request to authorize a purchase by a user who is using the temporary account number and related information provided at block 330. The purchase authorization request may be received via any communications means. The request for purchase authorization may originate at a retailer where the user is present and interacting with a POS device, at a virtual store where the user is shopping online, or from a retailer interacting with the user over the telephone. The request may come directly from a retailer or merchant, or may come from a payment processing service. All such embodiments are contemplated as within the scope of the present disclosure. In one embodiment, an email, text message, phone call, or other notification may be sent to a user when such a purchase authorization request is received by a temporary account number provider.

At block 360, a temporary account number provider may determine an actual account number and related information associated with the temporary account number provided in the request received at block 350. This may be done using data stored at block 340, and/or using alternate means. Any information that may be required to obtain a purchase authorization may be obtained at block 360, including a purchase amount which may be derived from the purchase authorization request received at block 350. Having collected or determined all the necessary data, a temporary account number provider may then generate a request for purchase authorization using actual account information and transmit that request to an issuer or other payment processing provider at block 370 using any communications means.

At block 380, a response to the request for purchase authorization using actual account information may be received at a temporary account number provider from an issuer or other payment processing provider using any communications means. At block 390, the response is processed and a response to the purchase authorization request received from a merchant at block 350 is generated. The response to the merchant may include the acceptance or rejection as set forth in the response received at block 380, as well as the temporary account number and related information. At block 390, a determination may be made as to the temporary account number and related information that currently corresponds to the actual account number and related information contained in the response received at block 380 from an issuer or other payment processing provider. Once a response is generated, it may be transmitted to a merchant, retailer, or other interested party using any communications means. In one embodiment, an email, text message, phone call, or other notification may be sent to a user when such a purchase authorization request is processed by a temporary account number provider. All such embodiments are contemplated as within the scope of the present disclosure.

Figure 4:
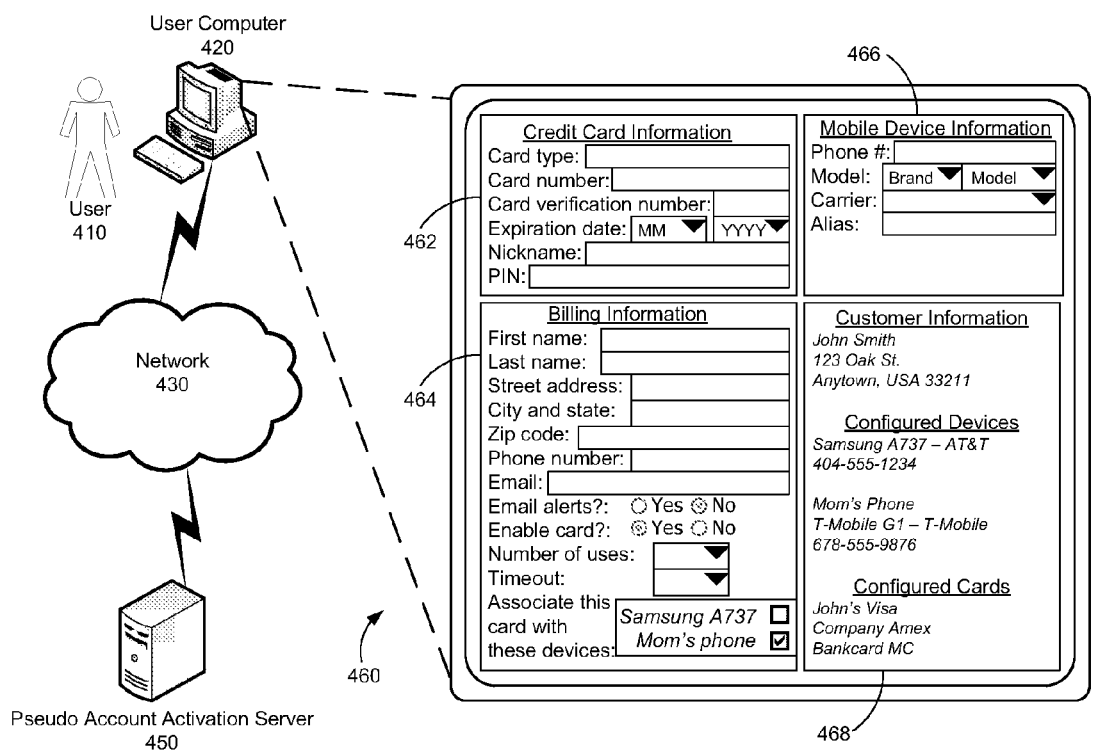
FIG. 4 is a graphical representation of a non-limiting exemplary system in which systems and methods for randomized mobile payments may be implemented and a non-limiting exemplary user interface.

FIG. 4 illustrates a non-limiting exemplary embodiment of an activation system and user interface for activating and configuring a user account with a temporary account number provider. User 410 may be operating computer 420, which may be any type of computing device, including a personal computer, laptop, or mobile computing device such as a mobile telephone with computing capabilities. Computer 420 may be configured to communicate with network 430, which may be any computer, data, or voice network, wired or wireless, or any combination thereof, and which may include two or more communicatively connected networks. Computer 420 may be communicating with pseudo account activation server 450 that may be operated and/or maintained by a temporary account number provider. Pseudo account activation server 450 represents any number of devices of any type, and combination of devices, that may be operated by a temporary account number provider.

User 410 may be interacting with user interface 460 while operating user computer 420. User interface 460 may be generated and presented using any means, including any combination of software and hardware. The information represented on user interface 460 may be presented on one screen or may be distributed among several screens or windows, and may be supplemented by additional information and data field. Moreover, not all the information displayed by user interface 460 may be required or presented. All such embodiments are contemplated as within the scope of the present disclosure.

In order to use the services of a temporary account number provider, a user may be required to provide credit or debit card information. This information may be used by a temporary account number provider to obtain purchase authorizations and to correlate actual account numbers to temporary account numbers. In section 462 of user interface 460, a user may enter information about a credit or debit card, including a card type (for example, VISA®, MASTERCARD®, AMERICAN EXPRESS®, etc.), a card number, an expiration date, and a card verification number such as a CVV, CVC, or CID. A user may also enter a PIN for a card or account. This may be an issuer PIN, such as those required to use a debit card. Alternatively, this may be a user-defined PIN that may be used on a mobile device to verify that a user requesting a temporary account number is an authorized user, as described above. In another embodiment, no PIN may be provided during the activation process. Instead, a PIN may be provided to the actual user device and stored only there so that there was no record of the PIN anywhere else, thereby improving PIN security. In another alternative, only PINs associated with particular cards, account, or types of cards or accounts may be gathered during the activation process. For example, debit card PINS may be stored but not credit card PINS or PINS used to access the software on a user device that requests temporary account data. Any other card or account information may be provided or solicited.

The user may also provide a nickname or other identification for a card or account, which may be used to identify the account on a user device. Alternatively, a temporary account number provider may determine identifying information for a card or account. Such identifying information may be necessary because, in one embodiment, no actual account or card information is stored on the user device. Information may be entered into a user interface using any means, including free text field, dropdown menus, radio buttons, etc. The temporary account number provider may store card or account information and present it to a user, for example, in section 468.

Billing information for an account or card may also be required, and may be provided to a temporary account number provider through the user interface in a section such as section 464. Typical billing information may be entered, including a card or account owner's name, address, phone number, email address, and any other relevant information.

User preferences may also be entered in section 464 or any other section. For example, a user may have the option to get alerts emailed to the user regarding account activity, such as each time an account is used, each time a purchase exceeds a predetermined threshold, or any time any other activity of interest may take place. In another embodiment, a user may have the option of enabling or disabling the use of cards or accounts provided to a temporary account number provider. In still another embodiment, a user may have the option of selecting the devices from which an account or card may be accessible. For example, a user may wish to enable the user's device and a user's child's device to request temporary account data for a personal account, but only allow the user's device to request temporary account data for a business account. In another embodiment, a user may have the option of selecting a number of uses that a temporary account number and related information associated with the account or card may be used. For example, a user may specify that a temporary account number associated with a particular card or account may only be used two times before it is automatically erased or otherwise disabled. Alternatively, the temporary account number provider may set a number of uses for each temporary account number and related information, or may only use lifespan or timeout value to determine when to erase or otherwise disable a temporary account number and related information. In yet another embodiment, a user may have the option of specifying the lifespan or a temporary account number and related data. For example, a user may specify, or select from available options, a lifespan of ten minutes for temporary account numbers associated with a particular account or card. Alternatively, the temporary account number provider may set lifespan for each temporary account number and related information, or may only use number of uses to determine when to erase or otherwise disable a temporary account number and related information. Any other user preferences may be solicited or provided, and all such embodiments are contemplated as within the scope of the present disclosure.

In section 466, user device information may be provided. This information may allow a temporary account number provider to determine which user is sending a request for a temporary account number, or verify that a request for a temporary account number is coming from an authorized device. Information that may be provided includes a telephone number, a model and brand of a device, and a carrier configured to support the device. This information, such as model number and brand of device, may be used to determine an appropriate version or type of software for requesting temporary account data to provide to a user device. Aliases for devices may also be provided to simplify identifying devices by a user during the use of a randomized mobile payment system. Any other information about the user device may be provided.

User interface 460 may also provide information on the current configuration for user 410, such as that shown in section 468. The name and address of the user may be presented, as well as a listing of devices and related information and a listing of cards or accounts already configured and related information, such as the nicknames associated with the accounts. Any other information may be presented, including currently configured user preferences. All such embodiments are contemplated as within the scope of the present disclosure.

Figure 5:
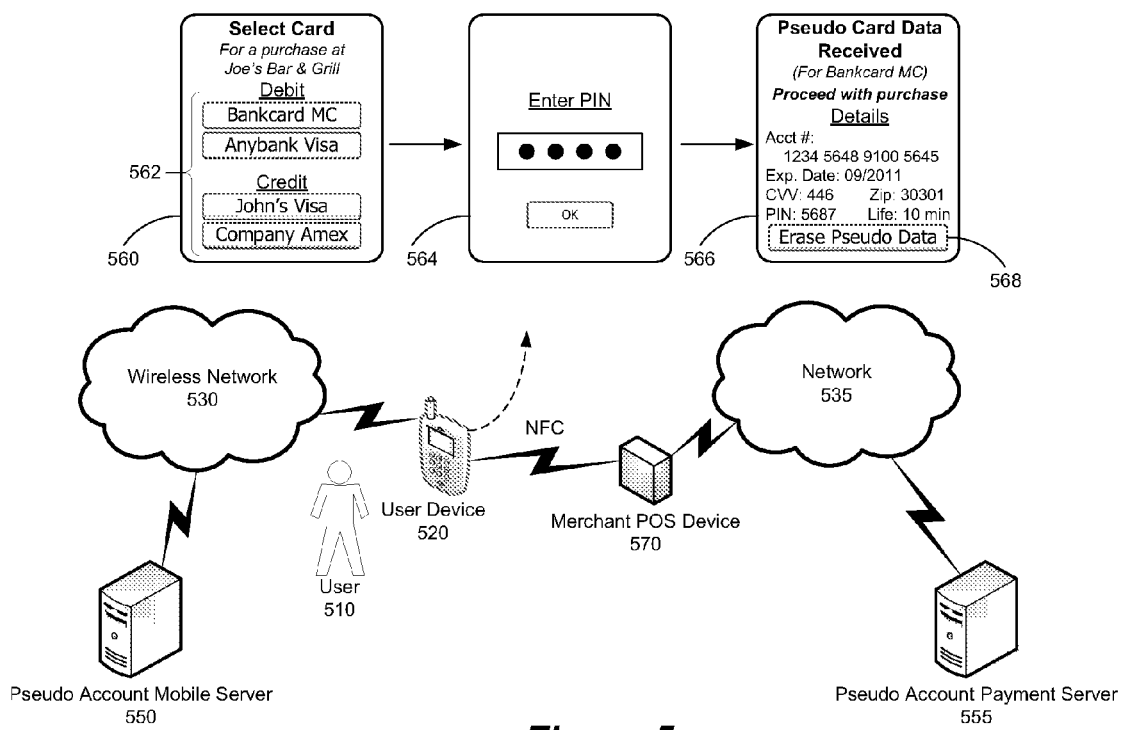
FIG. 5 is a graphical representation of another non-limiting exemplary system in which systems and methods for randomized mobile payments may be implemented and a non-limiting exemplary user interface.

Once information is provided to a temporary account number provider, in one embodiment through an user interface and activation process as disclosed herein, a user may then request and use temporary account numbers and related information to make purchases. FIG. 5 illustrates a non-limiting exemplary embodiment of a system for requesting and using a temporary account number and related information and user interfaces for requesting and receiving a temporary account number and related information from a temporary account number provider.

User 510 may be operating user device 520, which may be a mobile device with computing and wireless communications capabilities, such as a smart phone or PDA. Configured on user device 520 may be software and hardware that enables interaction with a temporary account number provider. Such software may be designed to operate specifically on mobile devices, or may general software configured to operate on a wide variety of devices. Such software may also be downloaded from a temporary account number provider, or otherwise provided by a temporary account number provider, or may be provided by another party or made available by another party, such as a telecommunications provider, a financial institution, or a third party. The software may reside on the device itself, on a subscriber identification module (SIM), a removable memory stick, or any other type of storage medium. In the event that the software resides on the SIM, the software may or may not be able to be activated on another device.

The software on user device 520, operating in conjunction with the hardware on user device 520, may present user interfaces to a user for requesting and receiving temporary account number data. For example, user 510 may activate temporary account number software on user device 520, which may in turn present user interface 560 on a display of user device 520. user interface 560 may present list 562 of available accounts or cards, identified by nicknames or any other identifying information other than actual account numbers. Note that in the preferred embodiment, no actual account information is stored on user device 520. User 510 may select the preferred card or account from list 562 using any means, including pressing a virtual or actual button associated with the preferred card or account, selecting the preferred card or account with a stylus, or any other means of selecting an object through a user interface. User interface 560 may also request an amount of purchase to be preauthorized. Alternatively, user device 520 may have received an amount of purchase from a merchant, for example from data received via NFC from merchant POS device 570. User interface 560 may also show other information about the pending purchase, such as the name, address, phone number, or other information about the merchant. Any other merchant data or account data that may be displayed is contemplated as within the scope of the present disclosure.

Once an account or card is selected from list 562, user interface 564 may be presented to user 510 on user device 520. User interface 564 may request a PIN number from user 510 to ensure that a temporary account number is being requested by an authorized user. The PIN number requested and entered may be associated with the specific account or card selected, or may be a general PIN number used for requesting a temporary account number associated with any available account of a user. In one alternative, the PIN number is a PIN number associated with an account by a financial institution, such as a PIN number used to access an account at an ATM. In another alternative, the PIN number is user configurable and may be set by the user through the activation process as disclosed herein. In still another alternative, the entry of a PIN number may be required before a listing of accounts, such as list 562 in user interface 560, is presented. In such an alternative, the requiring of a PIN number after an account is selected may still be employed to provide an extra layer of security, and the two PIN numbers may or may not be the same. In yet another alternative, rather than a PIN number, a security code of any type may be requested, or other security measures may be employed, such as biometric security measures. Any combination or origination of PIN numbers and/or security measures may be used, and all such embodiments are contemplated as within the scope of the present disclosure.

Once a PIN number is entered or other security measures are completed, or once user device 520 is otherwise configured to request a temporary account number and related data, a request for a temporary account number and related data may be generated and transmitted from user device 520 to wireless network 530. Wireless network 530 may be any one or more wireless networks, in some embodiments combined or interconnected to wired networks, that is capable of transmitting and receiving wireless data communications. Wireless network 530 may then transport the request for a temporary account number and related data to pseudo account mobile server 550. Pseudo account mobile server 550 may be operated and/or maintained by a temporary account number provider, and may be dedicated to providing temporary account numbers to mobile device, or may be configured to perform other functions. Pseudo account mobile server 550 may also be several servers, computers, network devices, and/or other device configured to response to requests for temporary account numbers. All such embodiments are contemplated as within the scope of the present disclosure.

Upon receiving the request for a temporary account number and related data, pseudo account mobile server 550 may generate temporary account number data, and transmit such data to user device 520 over wireless network 530. Pseudo account mobile server 550 may also communicate the temporary account number and related data to pseudo account payment server 555 so that payments using the temporary account data can be authorized. Pseudo account mobile server 550 may be configured to communicate with pseudo account payment server 555 over a network of any kind, or combination of networks. Alternatively, the functions of pseudo account payment server 555 and pseudo account mobile server 550 may be performed by a single device. In one alternative, when pseudo account mobile server 550 receives a request for temporary account data, it may forward the request to pseudo account payment server 555, or it may generate a request for temporary account data and send it to pseudo account payment server 555. Pseudo account payment server 555 may then send temporary account data to pseudo account mobile server 550 for transmission to user device 520. In another alternative embodiment, a separate server or other computing device may be configured to generate temporary account data, and may transmit such data to pseudo account mobile server 550 and/or pseudo account payment server 555. Any combination or configuration of devices configured to generate temporary account data is contemplated as within the scope of the present disclosure.

When the data is received at user device 520, a user interface such as that illustrated by user interface 566 may be displayed and presented to user 510. In some embodiments, the information presented in user interface 566 may include a temporary account number, an expiration date, a PIN, a billing zip code, a CVV, CVC, or CID, and/or a lifespan. The lifespan presented may be the amount of time the user has left to use the temporary account data before it is automatically erased from user device 520. The lifespan may be continually updated on user interface 566 so that user 510 can easily determine the amount of time remaining in which user 510 may use the temporary account data to make a purchase. In one embodiment, user interface 566 may provide control 568 which may erase all temporary account data from user device 520. This may be desirable in a situation where a user has completed a purchase and wants to remove temporary account data so that it is not accidently or maliciously used for purchases that the customer did not intend to make. Any other configurations of user interfaces, controls and information presented on user interfaces, and/or functions provided by user interfaces are contemplated as within the scope of the present disclosure.

In one embodiment, user device 520 may also activate NFC components configured on user device 520 and transmit the received temporary account data via NFC. When user 510 sees user interface 566, user 510 may proceed with a purchase. In one embodiment, user 510 may place user device 520 in an area so that the NFC components of user device 520 are proximate to merchant POS device 570, which may be configured to receive NFC data from devices such as user device 520. In another embodiment, user 510 may read temporary account data from user interface 566 and provide it to a merchant orally, for example by telephone, or electronically, for example by entering temporary account data into a web page. In another embodiment, user 510 may provide a portion of the temporary account data to a merchant through a merchant device. For example, if the temporary account data is associated with a debit card, user 510 may be required to enter a PIN number provided with the temporary account data at merchant POS device 570. All other means and methods of providing payment using temporary account data are contemplated as within the scope of the present disclosure.

Upon receiving temporary account data from user device 520, merchant POS device 570 may transmit a purchase authorization request, directly or indirectly, from merchant POS device 570. The request may include the temporary account number and any other data received from user device 520 or user 510 in any manner, and may also include purchase information, such as an amount of purchase and merchant identifying information. Such a request may be transmitted to network 535, which may be any type of network or combination of networks as described herein. From network 535, the purchase authorization request may be forwarded to a payment service provider that may in turn forward the purchase authorization request to pseudo account payment server 555. Alternatively, the purchase authorization request may be transmitted directly to pseudo account payment server 555, or pseudo account payment server 555 may also function as a payment service provider. Pseudo account payment server 555 may then correlate the temporary account data with actual account data as described herein, and may generate a purchase authorization request including purchase amounts and merchant information. This request may be transmitted from pseudo account payment server 555 to an issuer, financial institution, or payment processor for purchase authorization based on actual account data.

When a response is received from an issuer, financial institution, or payment processor, pseudo account payment server 555 may then generate a response for transmission to the merchant, in one embodiment to merchant POS device 570. The response generated may include the temporary account data which may be determined from the actual account data in the response from an issuer, financial institution, or payment processor and records maintained by pseudo account payment server 555, pseudo account mobile server 550, and/or another device operated by a temporary account number provider. The response may be transmitted to merchant POS device 570 over network 535.

Note also that any of the methods, systems, and means described herein may be implemented with any technology and any devices, components, systems, or systems, and any combination thereof. Note also that the randomized mobile payment system as described herein may be integrated into other telephony or communications related systems and devices, such as a wireless or wireline communications system or network, or any other type of communications systems or devices. All such embodiments are contemplated as within the scope of the present disclosure.

Figure 6:
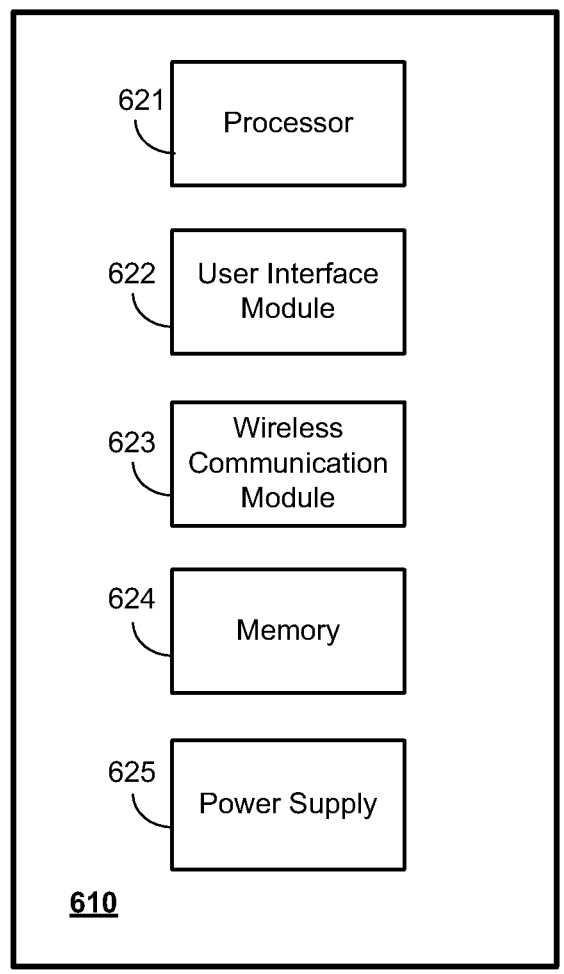
FIG. 6 is a block diagram of a non-limiting, exemplary user device that may be used in connection with an embodiment of the present disclosure.

FIG. 6 illustrates an example wireless device 610 that may be used in connection with an embodiment. References will also be made to other figures of the present disclosure as appropriate. For example, user devices 120, 420, and 520 may each be a wireless device of the type described in regard to FIG. 6, and may have some, all, or none of the components and modules described in regard to FIG. 6. It will be appreciated that the components and modules of wireless device 610 illustrated in FIG. 6 are illustrative, and that any number and type of components and/or modules may be present in wireless device 610. In addition, the functions performed by any or all of the components and modules illustrated in FIG. 6 may be performed by any number of physical components. Thus, it is possible that in some embodiments the functionality of more than one component and/or module illustrated in FIG. 6 may be performed by any number or types of hardware and/or software.

Processor 621 may be any type of circuitry that performs operations on behalf of wireless device 610. In one embodiment, processor 621 executes software (i.e., computer readable instructions stored in a computer readable medium) that may include functionality related to requesting and receiving temporary account data, communicating with, operating, or interfacing with a temporary account number provider system, and/or running software configured to operate, communicate, or interface with a temporary account number provider system, for example. User interface module 622 may be any type or combination of hardware and/or software that enables a user to operate and interact with wireless device 610, and, in one embodiment, to interact with a temporary account number provider system. For example, user interface module 622 may include a display, physical and "soft" keys, voice and/or speech recognition software, microphone, speaker and the like, and may be configured to display user interfaces, such as user interfaces 460, 560, 564, and 566. Wireless communication module 623 may be any type or combination of hardware and/or software that enables wireless device 610 to communicate with, for example, wireless network 170, wireless network 530, and/or any other type of wireless communications network. Memory 624 enables wireless device 610 to store information, temporary account numbers and related data, software for interacting with a temporary account number provider system, a web browser, other types of data, or the like. Memory 624 may take any form, such as internal random access memory (RAM), an SD card, a microSD card and the like. Power supply 625 may be a battery or other type of power input (e.g., a charging cable that is connected to an electrical outlet, etc.) that is capable of powering wireless device 610.

Figure 7:
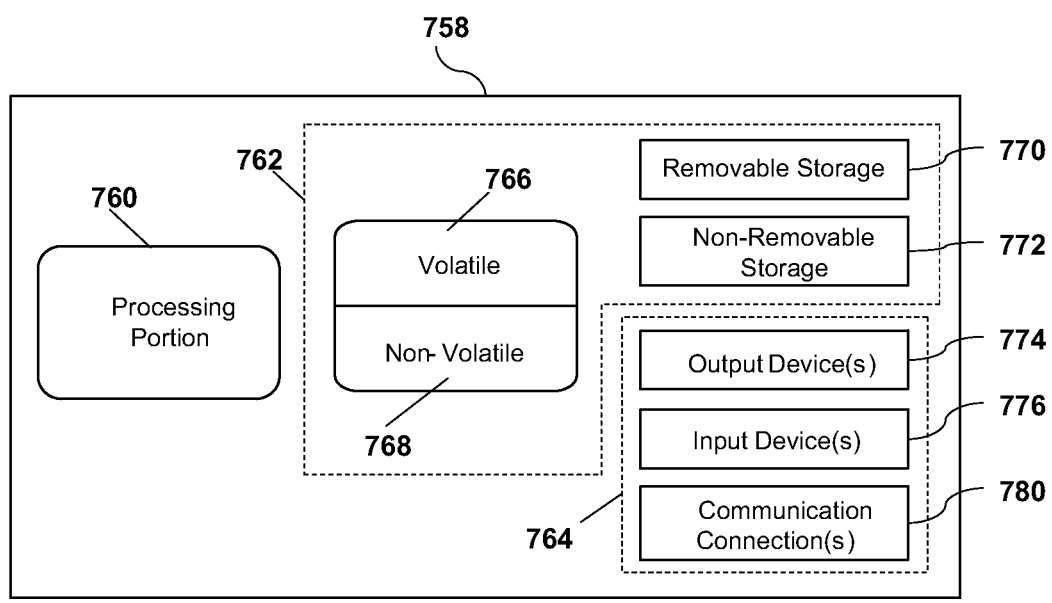
FIG. 7 is a block diagram of a non-limiting, exemplary processor in which the present subject matter may be implemented.

FIG. 7 is a block diagram of an example processor 758 which may be employed in any of the embodiments described herein, including as one or more components of user devices 120, 122, 420, or 520, or devices 130, 140, 150, 160, 190, 450, 550, 555, or 570, or as one or more components of communications network equipment or related equipment, such as any component of networks 170, 180, 430, 530, or 535 and/or as one or more components of any device, component, system, or subsystem that may implement any portion of the subject matter described herein. It is emphasized that the block diagram depicted in FIG. 7 is exemplary and not intended to imply a specific implementation. Thus, the processor 758 can be implemented as a single processor or multiple processors. Multiple processors can be distributed or centrally located. Multiple processors can communicate wirelessly, via hard wire, or any combination thereof.

The processor 758 comprises a processing portion 760, a memory portion 762, and an input/output portion 764. The processing portion 760, memory portion 762, and input/output portion 764 are coupled together (coupling not shown in FIG. 7) to allow communications between these portions. The input/output portion 764 is capable of providing and/or receiving components, commands, and/or instructions, utilized to, for example, operate a temporary account number provider system, a user device configure to interact with a temporary account number provider system, a network configured transport requests for temporary account data and responses to such request, or any subsystem or component thereof.

The processor 758 can be implemented as a client processor and/or a server processor. In a basic configuration, the processor 758 may include at least one processing portion 760 and memory portion 762. The memory portion 762 can store any information utilized in conjunction with transmitting, receiving, and/or processing temporary account number requests, responses, activation data, or any other data or information. For example, as described above, the memory portion is capable of storing temporary account data, actual account data, correlations between temporary and actual account data, and/or software capable of operating a temporary account number provider system and/or a user device and software configured to interact with a temporary account number provider system. Depending upon the exact configuration and type of processor, the memory portion 762 can be volatile (such as RAM) 766, non-volatile (such as ROM, flash memory, etc.) 768, or a combination thereof. The processor 758 can have additional features/functionality. For example, the processor 758 can include additional storage (removable storage 770 and/or non-removable storage 772) including, but not limited to, magnetic or optical disks, tape, flash, smart cards or a combination thereof. Computer storage media, such as memory and storage elements 762, 770, 772, 766, and 768, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 758. Any such computer storage media may be part of or communicatively connected to the processor 758.

The processor 758 can also contain the communications connection(s) 780 that allow the processor 758 to communicate with other devices, for example through networks 170, 180, 430, 530, or 535. Communications connection(s) 780 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 758 also can have input device(s) 776 such as keyboard, keypad, mouse, pen, voice input device, touch input device, etc. Output device(s) 774 such as a display, speakers, printer, etc. also may be included.

While example embodiments of systems and methods for operating a temporary account number provider system and user devices that interact with a temporary account number provider system such as those described herein have been described in connection with various communications devices and computing devices/processors, the underlying concepts can be applied to any communications or computing device, processor, or system capable of implementing the systems and methods described. The various techniques described herein can be implemented in connection with hardware or software or, where appropriate, with a combination of both. Thus, the methods and apparatuses for randomized mobile payment systems and methods, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for or a component of a randomized mobile payment system. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems for randomized mobile payment as described herein can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a wireless telephone, or the like, the machine becomes an apparatus for a randomized mobile payment system. When implemented on a general-purpose processor, the program code combines with the processor to provide a unique apparatus that operates to invoke the functionality of a randomized mobile payment system. Additionally, any storage techniques used in connection with a randomized mobile payment system can invariably be a combination of hardware and software.

While systems and methods have been described herein in connection with the various embodiments of the various figures, it is to be understood that other similar embodiments can be used or modifications and additions can be made to the described embodiments for performing the same functions without deviating from the described systems and methods. For example, one skilled in the art will recognize that a randomized mobile payment system, a temporary account number provider system, or user device configurations as described in the present application may apply to any environment, whether wired or wireless, and may be applied to any number of such devices connected via one or more communications networks and interacting across such networks. Therefore, randomized mobile payment systems such as those described herein should not be limited to any single embodiment, but rather should be construed in breadth and scope in accordance with the appended claims.

What is claimed is:

1. A system for providing a mobile payment using a user device without requiring an actual personal account number be stored on the user device, the system comprising:
 a receiver configured to:
  receive a first request for a temporary account number from the user device, the first request comprising a user device identifier that is distinct from a personal account number associated with a user of the user device, wherein the personal account number associated with the user of the user device is not displayed or stored on the user device, and
  receive a first purchase authorization request comprising the temporary account number;
 a temporary account number generator, in communication with at least the receiver, the temporary account number generator configured to:
  determine the personal account number based on at least the user device identifier of the first request,
  select the temporary account number from among a plurality of available temporary account numbers, and
  record a correlation of the selected temporary account number to the personal account number;
 a processor, in communication with at least the receiver and a transmitter, the processor configured to:
  determine the personal account number based on the temporary account number, and
  generate a second purchase authorization request comprising the personal account number; and
 the transmitter configured to:
  transmit the temporary account number to the user device, and
  transmit the second purchase authorization request to a payment processor.

2. The system of claim 1, wherein the receiver is further configured to receive a plurality of predetermined temporary account numbers from an account issuer.

3. The system of claim 1, wherein the temporary account number generator is further configured to associate the temporary account number with the user device identifier.

4. The system of claim 1, wherein the temporary account number generator is further configured to generate the plurality of available temporary account numbers by determining one or more potential temporary account numbers from among a plurality of temporary account numbers that are not associated with the user device.

5. The system of claim 1, wherein the temporary account number generator is further configured to generate the plurality of available temporary account numbers by determining one or more potential temporary account numbers from among a plurality of temporary account numbers that have not been used as temporary account numbers for at least a predetermined amount of time.

6. The system of claim 1, wherein the temporary account number generator is further configured to determine the personal account number from among a plurality of accounts associated with the user of the user device.

7. The system of claim 1, wherein the temporary account number comprises one of a key or a seed.

8. The system of claim 1, wherein the temporary account number generator is configured to randomly select the temporary account number from among the plurality of available temporary account numbers.

9. The system of claim 1, wherein the transmitter is further configured to transmit an email message to the user responsive to the receiver receiving the first purchase authorization request.

10. A non-transitory computer-readable medium comprising computer-readable instructions, the computer-readable instructions comprising instructions that, when executed by a processor, cause the processor to effectuate operations comprising:
 receiving a first request for a temporary account number from a user device, the first request comprising a user device identifier that is distinct from a personal account number associated with a user of the user device, wherein the personal account number associated with the user of the user device is not displayed or stored on the user device;
 determining the personal account number based on at least the user device identifier of the first request;
 selecting a temporary account number from among a plurality of predetermined temporary account numbers associated with an account issuer;
 recording a correlation of the temporary account number to the personal account number;
 transmitting the temporary account number to the user device;

receiving a first purchase authorization request comprising the temporary account number;

determining the personal account number based on the temporary account number;

generating a second purchase authorization request comprising the personal account number;

transmitting the second purchase authorization request to a payment processor.

11. The non-transitory computer-readable medium of claim 10, wherein the operations further comprise receiving the plurality of predetermined temporary account numbers from the account issuer.

12. The non-transitory computer-readable medium of claim 10, wherein the operations further comprise associating the temporary account number with the user device identifier.

13. The non-transitory computer-readable medium of claim 10, wherein the operations further comprise generating the plurality of predetermined temporary account numbers by determining one or more potential temporary account numbers from among a plurality of temporary account numbers that are not associated with the user device.

14. The non-transitory computer-readable medium of claim 10, wherein the operations further comprise generating the plurality of predetermined temporary account numbers by determining one or more potential temporary account numbers from among a plurality of temporary account numbers that have not been used as temporary account numbers for at least a predetermined amount of time.

15. The non-transitory computer-readable medium of claim 14, wherein the operations further comprise determining an account from among a plurality of accounts associated with the user of the user device.

16. The non-transitory computer-readable medium of claim 10, wherein the temporary account number comprises one of a key or a seed.

17. The non-transitory computer-readable medium of claim 10, wherein the operations further comprise randomly selecting the temporary account number from among the plurality of predetermined temporary account numbers.

18. The non-transitory computer-readable medium of claim 10, wherein the operations further comprise transmitting an email message to the user responsive to receiving the first purchase authorization request.

19. The non-transitory computer-readable medium of claim 10, wherein the operations further comprise transmitting an instruction that causes the user device to present a user interface.

20. The non-transitory computer-readable medium of claim 10, wherein the operations further comprise transmitting the temporary account number to a payment server.

21. A system for providing a mobile payment using a user device without requiring an actual personal account number be stored on the user device, the system, comprising:

a receiver configured to:
  receive a first request for a temporary account number from the user device, wherein a personal account number associated with a user of the user device is not displayed or stored on the user device, and
  receive a first purchase authorization request comprising the temporary account number;

a temporary account number generator, in communication with at least the receiver, the temporary account number generator configured to:
  determine the personal account number based on the first request for the temporary account number,
  select a seed to be used by a number generator executing on the user device to create the temporary account number, and a processor, in communication with at least the receiver and a transmitter, the processor configured to:
  decode the temporary account number,
  correlate the decoded temporary account number with the personal account number, and
  generate a second purchase authorization request comprising the personal account number; and the transmitter configured to:
  transmit the seed to the user device, and
  transmit the second purchase authorization request to a payment processor.

22. The system of claim 21 wherein the receiver is configured to receive the first purchase authorization request from one or more of a point-of-sale device and the payment processor.

23. The system of claim 21 wherein the temporary account number is in a format used by a point-of-sale device.

24. The system of claim 22 wherein the point-of-sale device is in direct communication with the payment processor.

25. A method for providing a mobile payment, comprising:

receiving a first request for a temporary account number from a user device, wherein a personal account number associated with a user of the user device is not displayed or stored on the user device;

determining the personal account number based on the first request for the temporary account number;

selecting a seed to be used by a number generator executing on the user device to create the temporary account number;

transmitting the seed to the user device;

receiving a first purchase authorization request comprising the temporary account number;

decoding the temporary account number;

correlating the decoded temporary account number with the personal account number;

generating a second purchase authorization request comprising the personal account number; and transmitting the second purchase authorization request to a payment processor.

26. The method of claim 25 wherein the temporary account number is in a format used by a point-of-sale device.

* * * * *